US012617377B2

(12) United States Patent
Huelsmann

(10) Patent No.: US 12,617,377 B2
(45) Date of Patent: May 5, 2026

(54) DEVICE AND METHOD FOR THE ADAPTATION OF AN ACTUATING THRESHOLD OF A BRAKING ELEMENT OF A BRAKE-BY-WIRE BRAKE OF A MOTOR VEHICLE

(71) Applicant: Bayerische Motoren Werke Aktiengesellschaft, Munich (DE)

(72) Inventor: Florian Huelsmann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/846,360

(22) PCT Filed: May 23, 2023

(86) PCT No.: PCT/EP2023/063716
§ 371 (c)(1),
(2) Date: Sep. 12, 2024

(87) PCT Pub. No.: WO2023/241886
PCT Pub. Date: Dec. 21, 2023

(65) Prior Publication Data
US 2025/0196822 A1 Jun. 19, 2025

(30) Foreign Application Priority Data
Jun. 14, 2022 (DE) ..................... 10 2022 114 897.1

(51) Int. Cl.
B60T 8/171 (2006.01)
B60T 7/04 (2006.01)
B60T 8/172 (2006.01)
(52) U.S. Cl.
CPC .............. B60T 8/171 (2013.01); B60T 7/042 (2013.01); B60T 8/172 (2013.01); *B60T 2220/04* (2013.01); *B60T 2270/82* (2013.01)

(58) Field of Classification Search
CPC .......... B60T 8/171; B60T 7/042; B60T 8/172; B60T 2220/04; B60T 2270/82
See application file for complete search history.

(56) References Cited

U.S. PATENT DOCUMENTS

| | | | | |
|---|---|---|---|---|
| 5,719,769 A | * | 2/1998 | Brugger | ................ B60T 13/662 |
| | | | | 303/155 |
| 6,227,629 B1 | | 5/2001 | Yoshida et al. | |

(Continued)

FOREIGN PATENT DOCUMENTS

| | | | | |
|---|---|---|---|---|
| CN | 109791419 A | * | 5/2019 | ............. B60T 7/042 |
| CN | 113479176 A | | 10/2021 | |

(Continued)

OTHER PUBLICATIONS

International Search Report (PCT/ISA/210) issued in PCT Application No. PCT/EP2023/063716 dated Sep. 13, 2023 with English translation (5 pages).

(Continued)

*Primary Examiner* — Long T Tran
*Assistant Examiner* — Charles J Brauch
(74) *Attorney, Agent, or Firm* — Crowell & Moring LLP

(57) ABSTRACT

A method for the adaptation of an actuating threshold of a braking element of a brake-by-wire brake of a motor vehicle determines initiation of a braking torque of the brake-by-wire brake at a predetermined actuating travel of the braking element. A control unit regulates the brake-by-wire brake, wherein the actuating travel of the braking element is sensed continuously by way of a travel sensor when the braking element is manually actuated. A predetermined constant actuating force is set or an actuating force is determined continuously by way of a sensor. Furthermore, a characteristic curve is determined from at least the sensed actuating travel and the actuating force by way of the control unit and a characteristic property, in particular a maximum of a (Continued)

second derivative of the characteristic curve, is determined by way of the control unit.

9 Claims, 2 Drawing Sheets

(56) References Cited

U.S. PATENT DOCUMENTS

| | | | |
|---|---|---|---|
| 9,233,676 B2 | 1/2016 | Ullrich et al. |
| 2023/0211764 A1 | 7/2023 | Toelge |

FOREIGN PATENT DOCUMENTS

| | | |
|---|---|---|
| DE | 697 03 971 T2 | 9/2001 |
| DE | 10 2004 040 616 A1 | 2/2006 |
| DE | 10 2013 226 243 A1 | 6/2015 |
| DE | 10 2018 202 737 A1 | 8/2019 |
| DE | 10 2020 114 568 A1 | 12/2021 |

OTHER PUBLICATIONS

German-language Written Opinion (PCT/ISA/237) issued in PCT Application No. PCT/EP2023/063716 dated Sep. 13, 2023 with English translation (10 pages).
German-language Search Report issued in German Application No. 10 2022 114 897.1 dated Feb. 13, 2023 with partial English translation (10 pages).

\* cited by examiner

DEVICE AND METHOD FOR THE
ADAPTATION OF AN ACTUATING
THRESHOLD OF A BRAKING ELEMENT OF
A BRAKE-BY-WIRE BRAKE OF A MOTOR
VEHICLE

BACKGROUND AND SUMMARY

This disclosure relates to a device and a method for the adaptation of an actuating threshold of a braking element of a brake-by-wire brake of a motor vehicle, which determines an initiation of a braking torque of the brake-by-wire brake in the event of a predetermined actuating travel of the braking element.

By-wire brake actuations that are "dry", i.e., without brake liquid, are the subject matter of the present developments. The counterforce, which the driver feels upon the actuation of the brake actuation, is normally generated by a spring-rubber construction therein. This construction can simulate the force-distance profile of a hydraulic brake actuation according to the prior art well and therefore generates a very similar actuation feeling.

The braking intention can be detected by way of a force sensor, which measures the actuating force, or by way of a distance sensor, which measures the actuating travel. In general, a distance sensor is used, since force sensors having the required measuring accuracy and reliability are comparatively expensive. A braking torque is then built up from the point where a specific threshold of the actuating distance is exceeded. For an optimum braking feeling, this threshold is to be as close as possible to the pressure point of the braking actuation.

A significant disadvantage of the braking intention detection by way of a distance sensor is the susceptibility to a shift of the pressure point. The pressure point can shift, for example, if the spring-rubber construction seizes or expands due to a temperature influence. Depending on the direction in which the pressure point shifts, in the case of a solely travel-based braking intention detection, braking torque is already built up before reaching the pressure point, or no braking torque is built up in spite of the pressure point being exceeded. Both cases can irritate the driver while driving, due to which hazardous situations can arise.

It is therefore an object of the present disclosure to provide a device and a method for the adaptation of an actuating threshold of a braking element of a brake-by-wire brake of a motor vehicle, which optimizes an adaptation of the actuating threshold and is provided cost-effectively.

According to the disclosure, a method is provided for the adaptation of an actuating threshold of a braking element of a brake-by-wire brake of a motor vehicle. The method comprises determining an initiation of a braking torque of the brake-by-wire brake in the event of a predetermined actuating travel of the braking element, using a control unit for regulating the brake-by-wire brake. Initially the actuating travel of the braking element is continuously detected by way of a distance sensor when the braking element is manually actuated, in which a predetermined constant actuating force is defined or an actuating force is continuously determined by way of a sensor. Furthermore, a characteristic curve is determined on the basis of at least the detected actuating travel and the actuating force by way of the control unit and a characteristic property, in particular a maximum of a second derivative, of the characteristic curve is determined by way of the control unit. A pressure point is then defined, which corresponds to an actuating travel in the case of the characteristic property, in particular the maximum of the second derivative of the characteristic curve, by way of the control unit. Thereupon, by way of the control unit, the actuating threshold of the braking element is adapted to the pressure point or to an actuating travel, which corresponds to a sum of a predetermined travel and the pressure point.

This has an advantage that the use of an expensive force sensor for the braking intention detection in the case of a by-wire braking actuation can be omitted. Instead, the braking intention can be detected by way of a distance sensor without having difficulties with a traveling pressure point. The pressure point in the meaning of the disclosure is defined as the actuating travel of the maximum of the second derivative of the actuating force-actuating travel characteristic curve of the brake actuation. In particular all geometric properties of the characteristic curve, such as intersections with the coordinate axes, high and low points, inflection points, possibly saddle points and flat points, asymptotes, or, for example, a behavior in infinity are to be understood as characteristic properties of the characteristic curve.

In one advantageous embodiment variant, it is provided that, in the case of the manual actuation, the braking element is actuated with a constant actuating force. The most accurate possible determination of the pressure point without a force sensor can thus take place.

In one exemplary embodiment of the disclosure, it is provided that, when the characteristic curve is determined, an actuating travel-time characteristic curve is determined, and when the maximum is determined, an actuating acceleration is determined on the basis of a second derivative of the actuating travel by way of the control unit. The pressure point can be determined as accurately as possible on the basis of these data.

In an alternative embodiment of the disclosure, it is provided that furthermore a force sensor is arranged at the braking element and an actuating force of the braking element is determined during the continuous detection. This has the advantage that the force sensor does not have to have high absolute accuracy or reliability in this case, but only has to have a sufficient relative accuracy to qualitatively detect the force profile during a braking actuation. Accordingly, the use of an expensive force sensor for the braking intention detection in the case of a by-wire braking actuation can be omitted and a simpler, less expensive force sensor can be used.

Furthermore, an embodiment is favorable in which, upon the determination of the characteristic curve, an actuating force-actuating travel characteristic curve is determined on the basis of the detected actuating travel and the detected actuating force by way of the control unit. The pressure point can thus be determined particularly accurately.

In a preferred embodiment of the disclosure, upon the adaptation, the actuating threshold of the braking element is continuously adapted by way of the control unit. In this way, the measurement and evaluation can take place in real time on a control unit and the position of the pressure point can thus be continuously readjusted, in particular even while driving.

According to the disclosure, a device is furthermore proposed for the adaptation of an actuating threshold of a braking element of a brake-by-wire brake of a motor vehicle, which device determines an initiation of a braking torque of the brake-by-wire brake in the event of a predetermined actuating travel of the braking element, in particular according to a method according to the preceding disclosure, having a control unit for regulating the brake-by-wire brake. A distance sensor is provided here for detecting the actuating travel of the braking element. Furthermore, a characteristic curve is determinable on the basis of at least the detected actuating travel by way of the control unit and a maximum of a second derivative of the characteristic curve is determinable by way of the control unit. In addition, a pressure point, which corresponds to an actuating travel at the maximum of the second derivative of the characteristic curve, is definable by way of the control unit. In addition, an actuating threshold of the braking element is adaptable to the pressure point or to an actuating travel, which corresponds to a sum of a predetermined travel and the pressure point, by way of the control unit.

This has the advantage that the use of an expensive force sensor for the braking intention detection in the case of a by-wire braking actuation can be omitted. Instead, the braking intention can be detected by way of a distance sensor without having difficulties with a traveling pressure point.

In one exemplary embodiment of the disclosure, the characteristic curve is an actuating travel-time characteristic curve. The pressure point can thus be determined as accurately as possible.

In a preferred alternative embodiment of the disclosure, furthermore a force sensor for continuously detecting an actuating force of the braking element is arranged at the braking element. Furthermore, the characteristic curve is an actuating force-actuating travel characteristic curve. An accuracy of the determination of the pressure point is further improved in this way.

The features disclosed above can be combined with one another as desired, provided this is technically possible and they are not contradictory to one another.

BRIEF DESCRIPTION OF THE DRAWINGS

Other advantageous refinements of the disclosure will be described in more detail hereinafter together with the description of the preferred embodiment of the disclosure on the basis of the figures.

The schematic figures are given by way of example. Identical reference signs in the figures indicate identical functional and/or structural features.

DETAILED DESCRIPTION OF THE DRAWINGS

Figure 1:
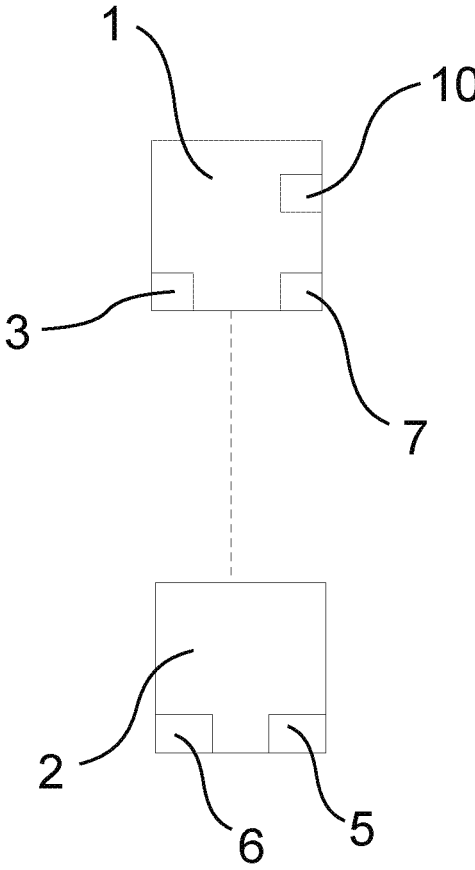
FIG. 1 shows a schematic view of a device for the adaptation of an actuating threshold of a braking element of a brake-by-wire brake of a motor vehicle; and, FIG. 2 shows an actuating force-actuating travel characteristic curve and a first and a second derivative of an actuating force-actuating travel characteristic curve having a pressure point and an actuating threshold.

FIG. 1 shows a schematic view of a device for the adaptation of an actuating threshold 10 of a braking element 1 of a brake-by-wire brake of a motor vehicle, which determines an initiation of the braking torque of the brake-by-wire brake in the event of a predetermined actuating travel of the braking element 1. The device comprises a control unit 2 for regulating the brake-by-wire brake. The control unit 2 may comprise or be part of the motor vehicle's Electronic Control Unit (ECU) or Electronic Control Module (ECM), and/or may comprise a processor or microprocessor, associated with a memory for storing software and/or logic for executing the methods disclosed herein. In addition, a distance sensor 3 for detecting the actuating travel of the braking element 1 and a force sensor 7 for continuously detecting an actuating force of the braking element 1 are provided at the braking element 1. A characteristic curve 5 is determinable here on the basis of the detected actuating travel and the detected actuating force by way of the control unit 2 and a maximum of a second derivative of the characteristic curve 5 is determinable by way of the control unit 2. The characteristic curve is an actuating force-actuating travel characteristic curve. Furthermore, a pressure point 6, which corresponds to an actuating travel at the maximum of the second derivative of the characteristic curve 5, is definable by way of the control unit 2. In addition, an actuating threshold 10 of the braking element 1 is adaptable to an actuating travel, which corresponds to a sum of a predetermined travel and the pressure point 6, by way of the control unit 2.

Accordingly, the device for carrying out a method for the adaptation of an actuating threshold 10 of a braking element 1 of a brake-by-wire brake of a motor vehicle, which determines an initiation of a braking torque of the brake-by-wire brake in the case of a predetermined actuating travel of the braking element (1), comprises a control unit 2 for regulating the brake-by-wire brake, in which initially the actuating travel of the braking element 1 is continuously detected by way of a distance sensor 3 when the braking element 1 is manually actuated. Furthermore, a characteristic curve 5 is determined on the basis of at least the detected actuating travel by way of the control unit 2, and a maximum of a second derivative of the characteristic curve 5 is determined by way of the control unit 2. A pressure point 6 is then defined, which corresponds to an actuating travel at the maximum of the second derivative of the characteristic curve 5, by way of the control unit 2. Thereupon, by way of the control unit 2, the actuating threshold 10 of the braking element 1 is adapted to the pressure point 6 or to an actuating travel, which corresponds to a sum of a predetermined travel and the pressure point 6.

During the continuous detection, an actuating force of the braking element 1 is detected, and, during the determination of the characteristic curve 5, by way of the control unit 2, an actuating force-actuating travel characteristic curve is determined on the basis of the detected actuating travel and the detected actuating force by way of the control unit 2. Furthermore, during the adaptation, the actuating threshold 10 of the braking element is continuously adapted.

Figure 2:
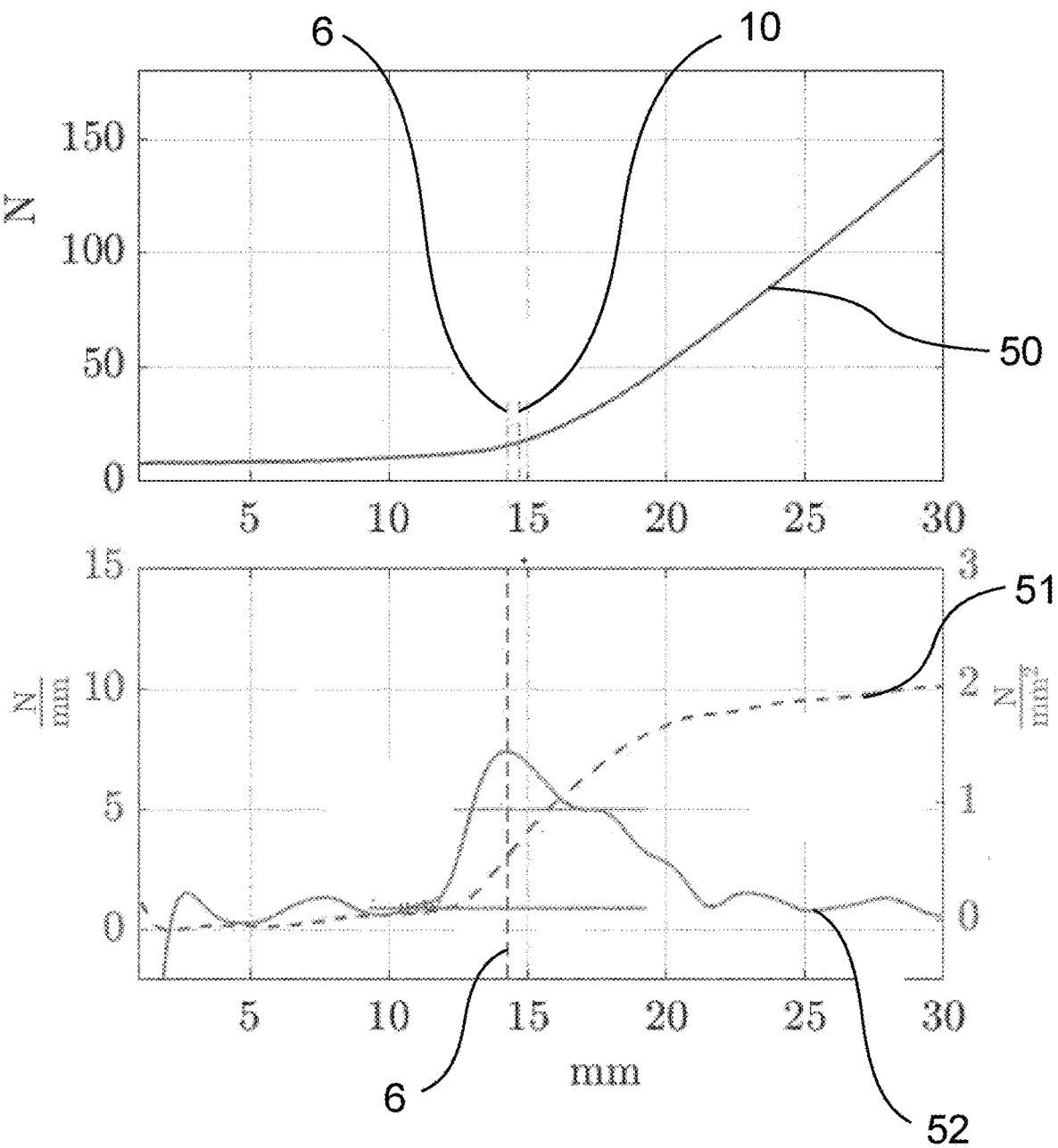

FIG. 2 shows an actuating force-actuating travel characteristic curve 50 and a first derivative 51 and second derivative 52 of an actuating force-actuating travel characteristic curve 51 having a pressure point 6 and an actuating threshold 10. In addition, an actuating threshold 10 of the braking element 1 is adapted to an actuating travel, which corresponds to a sum of a predetermined travel and the pressure point 6, by way of the control unit 2.

The disclosure is not restricted in its embodiment to the preferred exemplary embodiments specified above. Rather, a number of variants are conceivable, which make use of the described solution even in fundamentally different embodiments.

The invention claimed is:

1. A method for the adaptation of an actuating threshold of a braking element of a brake-by-wire brake of a motor vehicle, which determines an initiation of a braking torque of the brake-by-wire brake in the case of a predetermined actuating travel of the braking element, using a control unit for regulating the brake-by-wire brake, the method comprising:

detecting continuously the actuating travel of the braking element by way of a distance sensor, defining a predetermined constant actuating force or determining continuously an actuating force when the braking element is manually actuated, by way of a sensor, determining a characteristic curve on the basis of at least the detected actuating travel and the actuating force by way of the control unit, determining a maximum of a second derivative as a characteristic property of the characteristic curve by way of the control unit, defining a pressure point which corresponds to an actuating travel in the case of the maximum of the second derivative as the characteristic property of the characteristic curve by way of the control unit, adapting the actuating threshold of the braking element to the pressure point or to an actuating travel, which corresponds to a sum of a predetermined travel and the pressure point, by way of the control unit.

2. The method according to claim 1, wherein, during the manual actuation, the braking element is actuated using a constant actuating force.

3. The method according to claim 2, wherein, during the determination of the characteristic curve, an actuating travel-time characteristic curve is determined and, during the determination of the maximum of the second derivative as the characteristic property, an actuating acceleration is determined on the basis of a second derivative of the actuating travel by way of the control unit.

4. The method according to claim 1, wherein the sensor is a force sensor arranged at the braking element and, during the manual actuation, an actuating force of the braking element is determined.

5. The method according to claim 4, wherein, during the determination of the characteristic curve, an actuating force-actuating travel characteristic curve is determined on the basis of the detected actuating travel and the detected actuating force by way of the control unit.

6. The method according to claim 5, wherein, during the adaptation, the actuating threshold of the braking element is continuously adapted by way of the control unit.

7. A device for the adaptation of an actuating threshold of a braking element of a brake by-wire brake of a motor vehicle, which determines an initiation of a braking torque of the brake-by-wire brake in the case of a predetermined actuating travel of the braking element according to the method of claim 1, the device comprising:

a control unit for regulating the brake-by-wire brake, and a distance sensor for detecting the actuating travel of the braking element, wherein a characteristic curve is determinable by the control unit on the basis of at least the detected actuating travel, wherein a maximum of a second derivative of the characteristic curve is determinable by the control unit as a characteristic property, wherein a pressure point which corresponds to an actuating travel in the case of the characteristic property is defined by the control unit, and wherein an actuating threshold of the braking element is adapted by the control unit to the pressure point or to an actuating travel, which corresponds to a sum of a predetermined travel and the pressure point.

8. The device according to claim 7, wherein the characteristic curve is an actuating travel-time characteristic curve.

9. The device according to claim 7, wherein a force sensor for continuously detecting an actuating force of the braking element is arranged at the braking element, and wherein the characteristic curve is an actuating force-actuating travel characteristic curve.

\* \* \* \* \*